US011691691B2

(12) United States Patent
Andersson et al.

(10) Patent No.: US 11,691,691 B2
(45) Date of Patent: Jul. 4, 2023

(54) BIKE TRAILER

(71) Applicant: Thule Sweden AB, Hillerstorp (SE)

(72) Inventors: Stefan Andersson, Värnamo Jönköping (SE); Andreas Arvidsson, Sävsjö (SE); Karl Mendes, Calgary (CA); Daniel Britton, Calgary (CA); Garett Favero, Calgary (CA)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 17/474,939

(22) Filed: Sep. 14, 2021

(65) Prior Publication Data
US 2022/0089247 A1 Mar. 24, 2022

(30) Foreign Application Priority Data

Sep. 18, 2020 (EP) ..................... 20196800

(51) Int. Cl.
*B62K 27/00* (2006.01)
*B62K 27/12* (2006.01)
(52) U.S. Cl.
CPC ............ *B62K 27/003* (2013.01); *B62K 27/12* (2013.01)
(58) Field of Classification Search
CPC .................................................. B62K 27/003
See application file for complete search history.

(56) References Cited

U.S. PATENT DOCUMENTS

| 3,887,208 | A * | 6/1975 | Vidal | ........................ B62B 1/12 |
| | | | | D12/101 |
| 8,262,103 | B2 * | 9/2012 | Enserink | .............. B62D 63/061 |
| | | | | 280/47.38 |
| 8,967,651 | B1 * | 3/2015 | Simic | ................... B62K 27/003 |
| | | | | 280/30 |
| 9,944,305 | B2 * | 4/2018 | Lee | ........................ B62K 27/003 |
| 10,647,340 | B2 * | 5/2020 | Kinnee | ..................... B62B 1/12 |

(Continued)

FOREIGN PATENT DOCUMENTS

| DE | 102006049770 A1 * | 5/2008 | ............. A45C 13/38 |
| DE | 20 2012 007 192 U1 | 11/2012 | |
| DE | 202012007192 U1 * | 1/2013 | ............. B62B 7/126 |

(Continued)

OTHER PUBLICATIONS

European Search Report in Application No. 20196800.5, dated Feb. 15, 2021 (7 pages).

*Primary Examiner* — Minnah L Seoh
*Assistant Examiner* — Hosam Shabara
(74) *Attorney, Agent, or Firm* — Sterne, Kessler, Goldstein & Fox P.L.L.C.

(57) ABSTRACT

Disclosed is a bike trailer having a main frame and a seat structure. The main frame defines an accommodating space for a passenger or load to be transported. The seat structure is transferable between an operational state in which the seat structure forms a seating area for the passenger, and a stowed state in which the seat structure is folded away thereby allowing the transport of loads other than passengers. The seat structure comprises a backrest portion with a seating side for at least partially contacting the back of a passenger. The backrest portion is accommodatable in the bike trailer such that at least the seating side of the backrest portion is protected against contact with loads to be carried when the seat structure is in the stowed state.

19 Claims, 5 Drawing Sheets

(56) References Cited

U.S. PATENT DOCUMENTS

2002/0096857 A1* 7/2002 Valdez .................. B62K 27/02
                                                           280/504
2010/0078912 A1    4/2010 Chang et al.

FOREIGN PATENT DOCUMENTS

EP          3895969 A1 * 10/2021
WO       2011/037756 A2    3/2011
WO     WO-2011037756 A2 *  3/2011  ............... B60D 1/00

* cited by examiner

BIKE TRAILER

CROSS REFERENCE TO RELATED APPLICATION

This application claims priority to EP Application No. 20196800.5, filed Sep. 18, 2020, which is hereby incorporated herein in its entirety.

FIELD OF THE INVENTION

The present disclosure relates to a bike trailer and, in particular, to a bike trailer which is variable between a passenger transport configuration and load transport configuration.

BACKGROUND

Bike trailers are usually used to transport kids, pets or other loads to be transported. Bike trailers are often tailored to a single specific purpose, for example transporting kids. Thus, if a user wants to use a bike trailer for a different purpose, for example for transporting a good, this is in some bike carriers not possible at all or at least not without carrying out multiple steps. This may lead to an annoying and cumbersome experience for the user. Furthermore, some bike trailers that are usable for transporting passengers and other loads do not provide satisfying supporting capabilities for both loads and passengers. A further drawback of some bike trailers is that portions of a passenger seat are exposed to goods to be transported.

SUMMARY

Thus, there is a need for an improved bike trailer that at least reduces some the above-mentioned drawbacks.

According to the present disclosure, a bike trailer according to independent claim 1 is provided. Advantageous further formations are subject of the dependent claims.

In addition, other desirable features and characteristics will become apparent from the summary and detailed description, and the appended claims, taken in conjunction with the accompanying drawings.

Disclosed is a bike trailer which is couplable to a bike. In the context of the present disclosure, the term "bike trailer" may be understood as a trailer which is at least configurable for being towed by a bike. Accordingly the term "bike trailer" may include trailers that are configured to be coupled to a bike but may also include trailers which can be rendered usable in connection with bikes by specific accessory equipment. Furthermore, the term "bike trailer" does not necessarily mean that such trailer is only usable as a trailer which is towable by a bike. Rather, the term shall also include carriers which comprise the primary function of being towed by a bike but may comprise a second function, for example the function of being used as a stroller. For that, the bike trailer may comprise a configuration which allows the detachable fixation of different members including for example a coupling unit or a supporting unit. The coupling unit may comprise a drawbar. The supporting unit may comprise a wheel. Furthermore, different adapter kits may be available for converting the bike trailer, for example a ski adapter kit which allows a person to tow the bike trailer in snow, a hiking adapter kit which allows a person to tow the bike trailer over rough terrain or a running adapter kit allowing the bike carrier to be pushed or pulled by a person.

According to embodiments, the bike trailer may comprise one of a main frame, a seat structure, a locking mechanism, a support arrangement and a fixation arrangement. In other words, a bike trailer may be provided which comprises one or more of the latter assemblies. These assemblies may be seen as functional building blocks that may be suitably combined for forming different embodiments. Furthermore, each of these assemblies may comprise one or more of the features that will be described in the summary, the detailed description and the claims in connection with the respective entity.

According to an embodiment, a bike trailer comprises a main frame and a seat structure. The main frame may comprise a lower frame portion, a rear frame portion and two side frame portions provided on opposite lateral sides of the lower frame portion. Furthermore, the main frame may comprise an upper frame portion. The main frame defines an accommodating space for a passenger or a load to be transported. The main frame can comprise multiple frame members that are coupled to form the different frame portions. Such frame members may include elongate members, such as profiles, for example made of aluminum, and coupling members connecting such elongate members. It is noted that some of the frame members may be part of different ones of the above-mentioned frame portions. In other words, configurations are possible in which the different frame portions share one or more common elements.

The lower frame portion can comprise a rectangular configuration. Fixation devices such as fixation loops for fixing loads to be carried other than passengers may be arranged in corner regions of the lower frame portion. The lower frame portion may comprise two elongate members that may extend in longitudinal direction of the bike trailer. Such elongate members may also be referred to as longitudinal members. The longitudinal members may be coupled to each other at end portions thereof, for example by means of elongate members which extend in cross direction, for example perpendicular to the longitudinal members. The elongate members extending in cross direction may also be referred to as cross members. At least one of the cross members may be integrally formed with the longitudinal members. For example, a portion of the lower frame portion may be configured by bending an elongate member into U-shape in which legs form the longitudinal members and the bridging portion connecting the legs forms a cross member. A cross member which couples the forward end portions of the longitudinal members may be arranged such that it mainly extends at a lower height compared to other elongate members of the lower frame portion. The cross member which couples the forward end portions will also be referred to as front cross member of the lower frame portion. The front cross member may be arranged below the longitudinal members and may be coupled to the end portions of the longitudinal members from below. The front cross member may comprise a U-shape with its free ends being coupled to longitudinal member, respectively.

The rear frame portion may be configured by two support assemblies that are oriented in height direction when the bike trailer is in use. Each support assembly may comprise an elongate member. Each support assembly may be configured foldable. Each support assembly may comprise a lower portion and an upper portion. The lower portions of the support assemblies may be coupled to each other by means of a support structure. The upper portion may be coupled to the lower portion by means of a pivot configuration. The pivot configuration may be configured to be releasably lockable. Accordingly, the pivot configuration may comprise a coupling unit for pivotably coupling a first end portion of the upper portion with a first end portion of the lower portion. Furthermore, the coupling unit comprises a blocking arrangement which allows to block a movement of the upper portion with respect to the lower portion when the rear frame portion is in an unfolded state. Such a blocking arrangement may comprise an engaging member which is engageable with a receiving portion formed in the upper portion and/or the lower portion.

The upper frame portion may comprise two elongate members which mainly extend in longitudinal direction of the bike trailer. The elongate members may be formed convex. Furthermore, the elongate members may extend in parallel. Front end portions of the two elongate members may be pivotably coupled to front end portions of the lower frame portion by means of hinge mechanisms. Rear end portions of the elongate members can be pivotably coupled to second end portions of upper portions of the rear frame portion. A handle portion may be coupled the rear end portions of the elongate members. The upper frame portion may further comprise a cross member fixedly coupling the rear end portions of the elongate members.

Each side frame portion may be formed by components already mentioned before in connection with the lower frame portion, the rear frame portion and the upper frame portion. For example, a first side frame portion may be formed by one elongate member of the lower frame portion, one support assembly of the rear frame portion and one elongate member of the upper frame portion.

The seat structure may be configured transferable between an operational state and stowed state. The operational state may be a state in which the seat structure forms a seating area for a passenger. The stowed state may be a state in which the seat structure is folded away thereby allowing the transport of loads other than passengers. Instead of folding the seat structure away, it is also conceivable to completely remove the entire seat structure or at least portions thereof and to stow the removed parts remotely. The seat structure may comprise a backrest portion. Furthermore, the seat structure may comprise a bottom support portion. Optionally, the seat structure may further comprise a footrest portion. The seat structure may be configured from multiple parts that are attached to each other or may at least partially be integrally formed. For example, the basic structure of the seat structure including a bottom support portion and backrest portion may be integrally formed whereas further elements of the seat structure, for example harness straps, maybe detachably coupled to such basic structure. The seat structure or at least the above-mentioned basic structure can comprise a fabric. Furthermore, the seat structure may comprise padded portions for comfortably supporting a passenger to be transported therein. The seat structure may be configured to be attached in the main frame in a suspended manner. The backrest portion may comprise a seating side for at least partially contacting the passenger, in particular the back of the passenger. The backrest portion may be accommodatable in the bike trailer such that at least the seating side of the backrest portion is protected against contact with loads to be carried when the seat structure is in the stowed state.

The main frame may comprise at least a first fixation portion for coupling an end portion of the backrest portion to the main frame. The seat structure may be in the operational state when the end portion is coupled to the first fixation portion.

The main frame may further comprise a second fixation portion for coupling the end portion of the backrest portion to the main frame, for example such that when the end portion is coupled to the second fixation portion the seat structure is in the stowed state. It is noted that the first fixation portion and the second fixation portion may each comprise or consist of multiple members which jointly form the first fixation portion and the second fixation portion, respectively. Such members do not have to be positioned close to each other. Rather, the first fixation portion and the second fixation portion may comprise members at different positions on the main frame, for example one member on one lateral side of the main frame and one member on the opposite lateral side of the main frame. One member of the first fixation portion may be provided on a first side frame portion and another member of the first fixation portion may be provided on a second side frame portion. Accordingly, the first fixation portion and the second fixation portion may each be configured as mechanisms allowing to couple the end portion of the backrest to the main frame.

The bike trailer may further comprise a cross member for coupling the end portion of the backrest to the main frame. Each fixation portion may be configured to detachably receive the cross member. The cross member may be a flexible or a rigid member. For example, the cross member may be a fabric suspendably fixable to the fixation portions and to end portions thereof. The cross member may comprise a cross bar. The cross bar may comprise a profile element, for example an extruded profile element. The cross bar may comprise a hollow profile. In an embodiment, the cross bar may be formed hollow cylindrical. For example, the cross bar may be a tubular member. The profile element can be manufactured from aluminum extrusion. The cross bar can be straight or may comprise a curved shape at least in sections thereof.

At least the first fixation portion may comprise a locking mechanism for releasably locking the cross member to the main frame. The locking mechanism may comprise receiving portion and a locking portion. The locking portion is transferable between a locking state and a release state. The locking portion can be configured to act as a stop when the locking mechanism is in the locking state. The locking portion can be configured to positively lock the cross member in the receiving portion in the locking state. Different configurations are available. For example, the locking portion may be configured engageable with the cross member. For that, the locking portion may be formed as a protrusion engageable with a recess formed in the cross member. The locking portion may be configured as blocking member which is movable to a position in which the locking portion serves as a stop blocking a movement of the cross member in a dismounting direction. In the release state, the locking portion may be retracted so as to allow a detachment of the cross member from the receiving portion.

The locking mechanism may further comprise an operating portion. The operating portion may be configured to be manually operable by a user. The locking portion may be operatively coupled to the operating portion. For that, the locking portion and the operating portion may be integrally formed in a single member or the locking portion and the operating portion may be force transmittingly coupled to each other by means of a force transfer mechanism. Such a force transfer mechanism may comprise bendable force transfer members such as a wire, for example a Bowden cable, or may comprise rigid force transfer members for example torsion bars and/or tie rods. The operating portion may be a pushbutton or a lever portion, for instance.

The locking portion may be prebiased towards the locking state by means of an urging member. The urging member can comprise a spring, for example a coil spring.

The locking portion and the operating portion may be integrally formed as a lever. The lever may be pivotably arranged on the main frame. For example, the lever may be pivotably arranged on the main frame such that the locking portion is transferable from the locking state into the release state by a pivoting movement of the locking portion towards the receiving portion. The lever may be coupled to the main frame such that the pivot axis thereof extends in cross direction of the bike trailer. For example, the pivot pin defining the pivot axis may extend in parallel with a rear cross member of the lower frame portion. If the configuration is provided as mentioned before, it is prevented that a force applied on the locking portion by an inserted cross member may lead to a disengagement of the cross member from the locking portion. The locking portion may be movable between a locking position in which it protrudes into an insertion path of the cross member and a release position in which it is retracted and does not protrude into the insertion path. The movement may be a pivoting movement. The locking position can be defined by an abutment. Since the release state can be achieved only by a pivoting movement of the locking portion towards the receiving portion and since a movement of the locking portion in opposite direction is blocked when the locking portion is in the locking position the locking mechanism comprises a self-locking capability.

The first fixation portion can be provided on the rear frame portion. The rear frame portion can be collapsible. The first fixation portion can be provided on an upper end portion of the rear frame portion. However, the first fixation portion can also be provided on a rear end portion of the upper frame portion. The first fixation portion can be arranged adjacent to or near a coupling portion for coupling the handle portion to the main frame.

The second fixation portion can be provided at a forward portion of the lower frame portion, for example at a forward end portion of the lower frame portion.

At least the first fixation portion can comprise a first coupling section provided on the main frame on one lateral side of the accommodating space and a second coupling section provided on the main frame on an opposite lateral side of the accommodating space. The locking mechanism may be provided in one of the first coupling section and the second coupling section.

The bike trailer may further comprise an adjustable support arrangement transferable between loading state and a stowed state. In the loading state, the support arrangement may extend over the majority of the lower frame portion of the main frame thereby providing a load carrying surface. In the stowed state, the support arrangement may extend over a smaller portion of the lower frame portion and may only provide a smaller carrying surface. For example, a configuration may be provided in which in a loading state the support arrangement extends over more than 50% of the lower frame portion and provides a load carrying surface of a specific length. In the stowed state, the support arrangement may provide a carrying surface of a smaller length.

The bike carrier may further be configured such that in the stowed state the seat structure is accommodated in the lower frame portion such that it is at least partially covered by the support arrangement when the same is in the loading state.

The adjustable support arrangement may be configured to extend over a smaller portion of the lower frame portion when the seat structure is in the operational state and may be configured to at least partially support the backrest portion when the seat structure is in the operational state. Accordingly, a portion of the adjustable support arrangement which is not used for the purpose of carrying and supporting loads in the stowed state may assist in supporting portion of the backrest.

The support arrangement may comprise segments. The segments can be pivotably coupled to each other or may be separate segments that are arranged adjacent to each other to provide the loading state. One or more of the segments may be formed flat and rigid. If the segments are pivotably coupled to each other, such a configuration may be provided by a fabric into which multiple flat and rigid supporting elements are integrated, for example sewn. In addition or alternatively, the bike trailer may comprise a fixation arrangement for releasably arresting the support arrangement on the lower frame portion at least in the loading state. The fixation arrangement may comprise fasteners, such as Velcro fasteners, and/or may comprise at least one engaging member configured to releasably engage with a portion of the support arrangement. Such an engaging member may comprise a latching portion configured to engage with, or partially surround a portion of the support arrangement.

Additional features and advantages of the above embodiments may be gleaned by the person skilled in the art from the following description of exemplary embodiments which are not to be construed as limiting.

BRIEF DESCRIPTION OF THE DRAWINGS

The present disclosure will hereinafter be described in conjunction with the following drawing figures, wherein like numerals denote like elements.

All Figures are only schematic depictions of exemplary embodiments in which, in particular, distances and dimensional correlations are not presented to scale.

DETAILED DESCRIPTION

The following detailed description is merely exemplary in nature and is not intended to limit application and uses.

Furthermore, there is no intention to be bound by any theory presented in the preceding background or summary or the following detailed description.

FIGS. 1 to 6 show different views of a bike trailer 1 according to an embodiment. The bike trailer 1 may comprise a main frame 100 defining an accommodating space 190 for a passenger or a load to be transported. The main frame 100 may comprise one of a lower frame portion 110, a rear frame portion 120, two side frame portions 130, 140 and an upper frame portion 180.

According to the embodiment, a handle portion 600 may be coupled to the main frame 100 at a rear upper end portion 102 of the main frame 100. The handle portion 600 may comprise a handlebar 602 which is coupled to the main frame 100 by means of a pivot configuration. More precisely, the handle portion 600 may comprise a hinge mechanism 604 which couples the handlebar 602 to the main frame 100 such that the handlebar 602 is pivotable about a horizontal axis, more precisely a horizontal axis which is perpendicular to a longitudinal axis of the bike trailer 1. The hinge mechanism 604 may define a corresponding pivot axis and may further comprise a locking mechanism which allows to releasably lock the handlebar 602 at a desired rotational position.

According to the embodiment, the lower frame portion 110 may comprise a rectangular configuration. More precisely, the lower frame portion 110 may comprise two elongate sections exemplary embodied as elongate members 111, 112 that may comprise a profile. The elongate members 111, 112 may extend in longitudinal direction of the bike trailer 1 and may form side sections of the lower frame portion 110. The elongate members 111, 112 may also referred to as longitudinal members. The elongate members 111, 112 may be coupled to each other at end portions thereof. In the present configuration, the elongate members 111, 112 may be coupled to each other by means of elongate cross members, more precisely a first, front cross member 113 and a second, rear cross member 114. Both cross members 113, 114 may extend cross to the extension direction of the elongate members 111, 112. The rear cross member 114 may be integrally formed with the elongate members 111, 112. The front cross member 113 may couple the forward end portions of the elongate members 111, 112 and may extend below the longitudinal members. In other words, the front cross member 113 may be coupled to the forward end portions of the elongate members 111, 112 at a lower portion of the same. In this way, a receiving space 115 may be created between the forward end portions allowing to accommodate a cross member 170 that will be described later in greater detail.

The rear frame portion 120 may comprise two support assemblies 121, 122 oriented in height direction when the bike carrier is in a use state, which means in a state in which the rear frame portion 120 is unfolded or deployed. Each support assembly 121, 122 may be configured foldable or collapsible. Each support assembly may comprise a lower portion 123, 124 and an upper portion 125, 126. The lower portions 123, 124 of the support assemblies may be coupled to each other by means of a support structure 127. First end portions of the upper portions 125, 126 may be coupled to first end portions of the lower portions 123, 124 by means of hinge mechanisms 128, 129. Second end portions of the lower portions 123, 124 may be pivotably coupled to a rear end portion of the lower frame portion 111. Second end portions of the upper portions 125, 126 may be pivotably coupled to a rear end portion of the upper frame portion 180.

The upper frame portion 180 may comprise two elongate members 181, 182 which mainly extend in longitudinal direction of the bike trailer 1. The elongate members 181, 182 may be formed convex. Furthermore, the elongate members 181, 182 may extend in parallel. Front end portions of the two elongate members 181, 182 may be pivotably coupled to front end portions of the lower frame portion 110 by means of hinge mechanisms 184, 185. Rear end portions of the elongate members 181, 182 may be pivotably coupled to the second end portions of the upper portions 125, 126. Furthermore, the handle portion 600 may also be coupled to the rear end portions of the elongate members 181, 182. The upper frame portion 180 may further comprise an optional cross member 183 fixedly coupling the rear end portions of the elongate members 183.

Each side frame portion 130, 140 may be formed by components already mentioned before in connection with the lower frame portion 110, the rear frame portion 120 and the upper frame portion 180. For example, a first side frame portion 130 may be formed by the elongate member 111 of the lower frame portion 110, the support assembly 121 of the rear frame portion 120 and the elongate member 181 of the upper frame portion 180. Similarly, a second side frame portion 140 may be formed by the elongate member 112 of the lower frame portion 110, the support assembly 122 of the rear frame portion 120 and the elongate member 182 of the upper frame portion 180.

Figure 1:
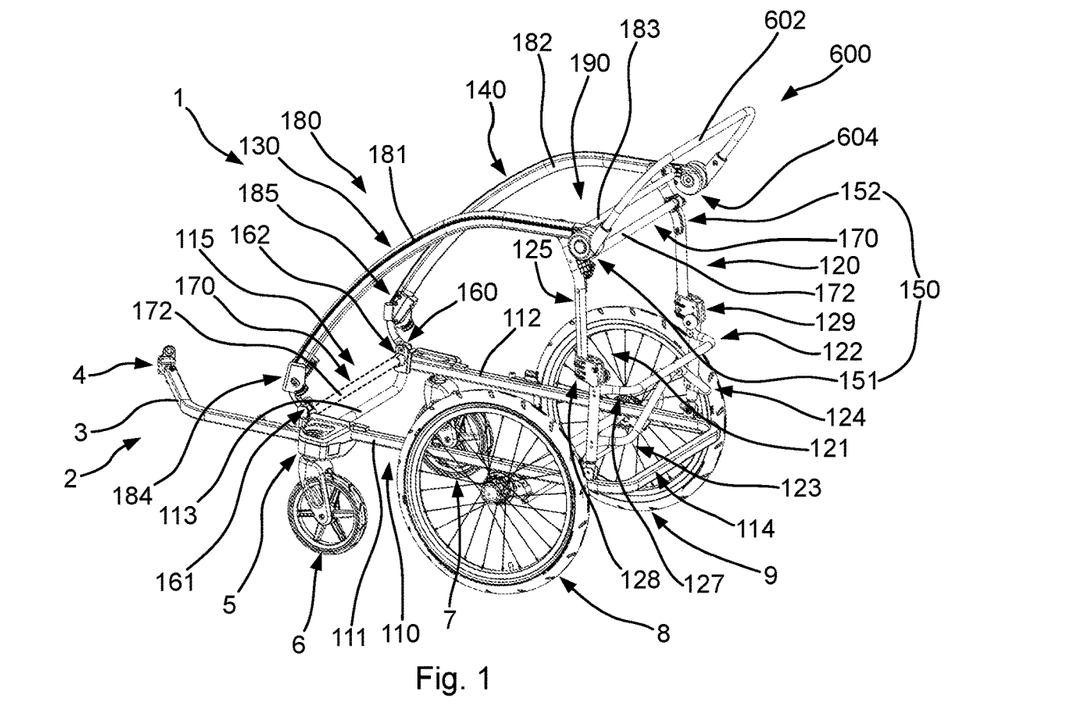
FIG. 1 shows a perspective view of a bike trailer according to an embodiment.
Figure 2:
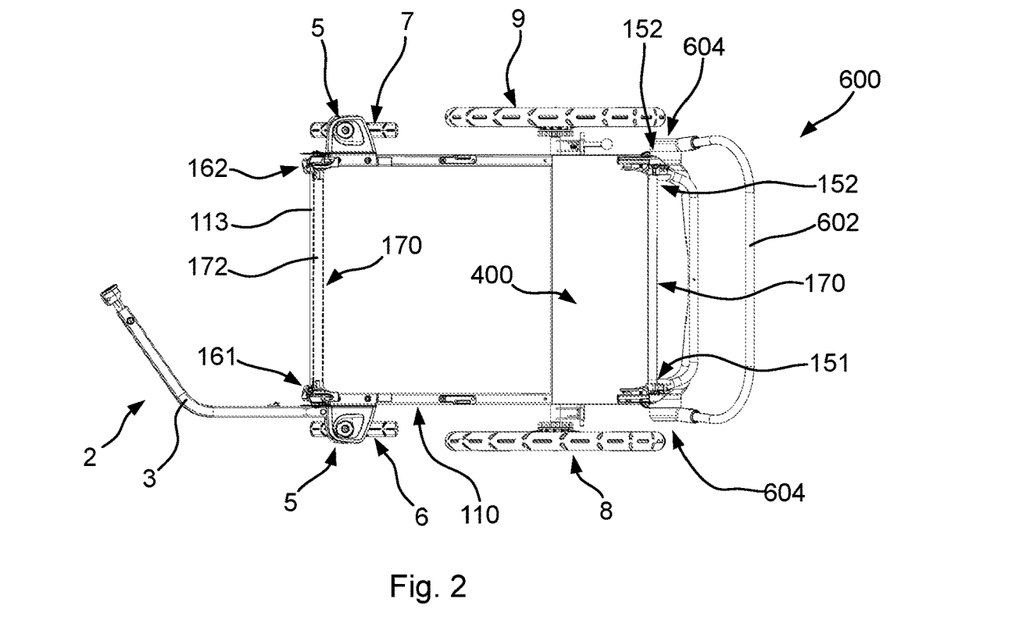
FIG. 2 shows a plan view of the bike trailer of FIG. 1.

As is further shown in FIG. 1, the main frame 100 may comprise a first fixation portion 150 and a second fixation portion 160. The first fixation portion 150 and the second fixation portion 160 may be configured for detachably receiving a cross member 170. In the embodiment, the cross member 170 may comprise a cross bar 172 which is configured to be held between the side frame portions 130, 140. The first fixation portion 150 and the second fixation portion 160 may be provided as distinct fixation portions each allowing the fixation of the cross member 170. In other words, the cross member 170 may be mounted on the main frame 100 at two different positions.

The first fixation portion 150 may be provided at an upper end portion of the rear frame portion 120. More precisely, according to an embodiment, the first fixation portion 150 may be provided at the upper portions 125, 126 of the rear frame portion 120. It is, however, noted that the first fixation portion 150 may be provided at a different position in the main frame 100. The first fixation portion 150 may comprise a first coupling section 151 and a second coupling section 152. The first coupling section 151 may be coupled to the upper portion 125 of the rear frame portion 120. The second coupling section 152 may be coupled to the upper portion 126 of the rear frame portion 120. The first coupling section 151 and the second coupling section 152 may be configured to detachably receive end portions of the cross member 170. Thus, the cross member 170 may be held between the first coupling section 151 and the second coupling section 152 in a suspended manner and such that it may extend in cross direction of the bike trailer 1.

The second fixation portion 160 may be provided at a forward end portion of the main frame 100, for example at a forward end portion of the lower frame portion 110. The second fixation portion 160 may comprise a first coupling section 161 and a second coupling section 162. The first coupling section 161 may be coupled to a forward end portion of the elongate member 111 and the second coupling section 162 may be coupled to a forward end portion of the elongate member 112. The first coupling section 161 and the second coupling section 162 may also be configured to detachably receive end portions of the cross member 170. Accordingly, the cross member 170 may be held between the first coupling section 161 and the second coupling section 162 in a suspended manner and such that it extends in cross direction of the bike trailer 1. According to an embodiment, the extension directions of the cross member 170 at the first fixation portion 150 and the second fixation portion 160 may be parallel with respect to each other.

The configuration allows to detachably fix the cross member 170 either at a rear upper end portion of the main frame 100 or at a front lower end portion of the main frame 100. A detachably fixed cross member 170 positioned in the first fixation portion 150 is shown in FIG. 1. A detachably fixed cross member 170 provided at the second fixation portion 160 is indicated with dashed lines.

The bike trailer 1 may further comprise a coupling unit 2 which may be configured to couple the main frame 100 to a bike. The coupling unit 2 may comprise a drawbar 3. A bike fixation device 4 may be provided at a first end of the drawbar 3. A second end of the drawbar 3 may be detachably received in a coupling device 5. The coupling device 5 may be provided on a forward end portion of the elongate member 111. In the present embodiment, the coupling device 5 may further be configured to detachably fix an auxiliary wheel 6 on the main frame 100 for converting the bike trailer into a stroller. Furthermore, the bike trailer 1 may comprise main wheels 7, 8 that are provided on opposite lateral sides of the main frame 100.

The bike trailer 1 further comprises a seat structure 200 as is best seen in FIGS. 3, 4, 5, 11 and 12. All of the latter mentioned Figures are sectional side views from the left side of the bike trailer 1 with a sectional plane extending vertically and in longitudinal direction of the bike trailer 1 and parallel to a vertical longitudinal middle plane. The seat structure 200 may comprise a bottom support portion 202 and a backrest portion 210. Optionally, the seat structure 200 may comprise a footrest portion 204. The bottom support portion 202 may mainly extend in longitudinal direction of the bike trailer 1 and may be provided at the same height as the lower frame portion 110. The bottom support portion 202 may be coupled to the lower frame portion 110, for example in a suspended manner such that it may extend between the elongate members 111, 112. A first end portion 213 of the backrest portion 210 may be coupled to a rear portion 203 of the bottom support portion 202 or may be integrally formed with the bottom support portion 202. A second end portion 214 of the backrest portion 210 may be coupled or integrally formed with the cross member 170. The backrest portion 210 may be made from a fabric or may at least comprise one or more fabric portions. The second end portion 214 may be sewn to the cross member 170 or fixedly mounted thereto in a different manner. According to the embodiment, the cross member 170 may be coupled to the second end portion 214 such that end portions thereof protrude from opposite sides of the second end portion 214. The seat structure 200 may further comprise a harness arrangement 209 which may comprise harness straps 211 four securing a passenger to be transported. The harness arrangement 209 is configured such that the harness straps 211 are provided on a seating side 212 of the backrest portion 210. The seating side is configured to at least partially contact the back of a passenger.

Figure 3:
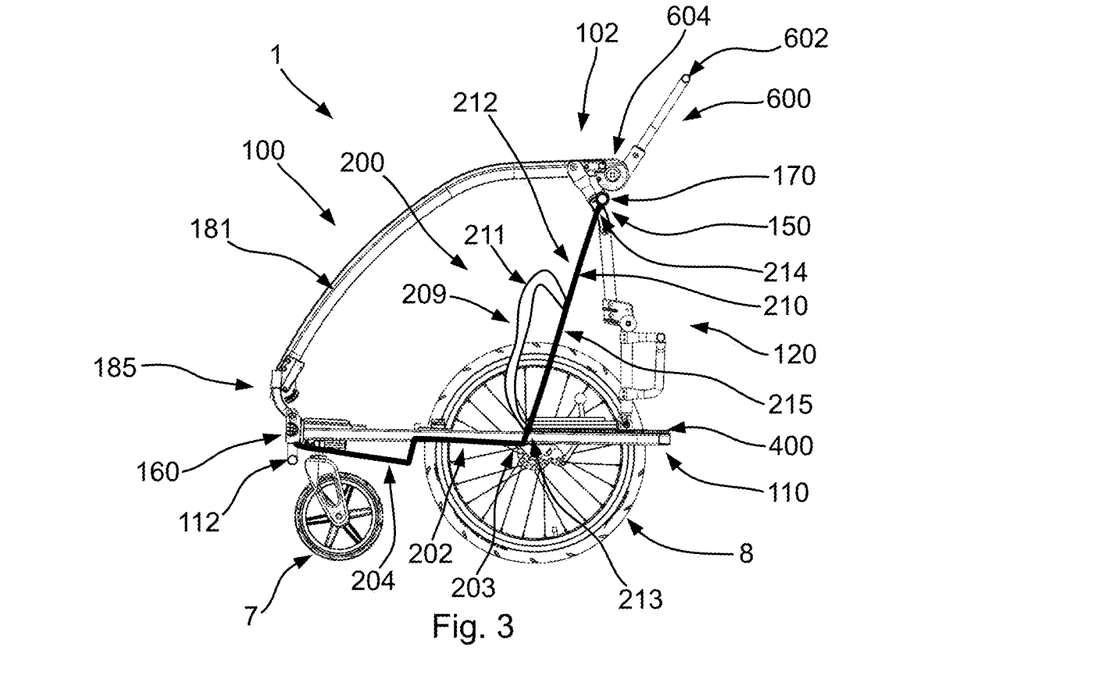
FIG. 3 shows a side view of the bike trailer FIG. 1 with a seat structure which is in an operational state.
Figure 4:
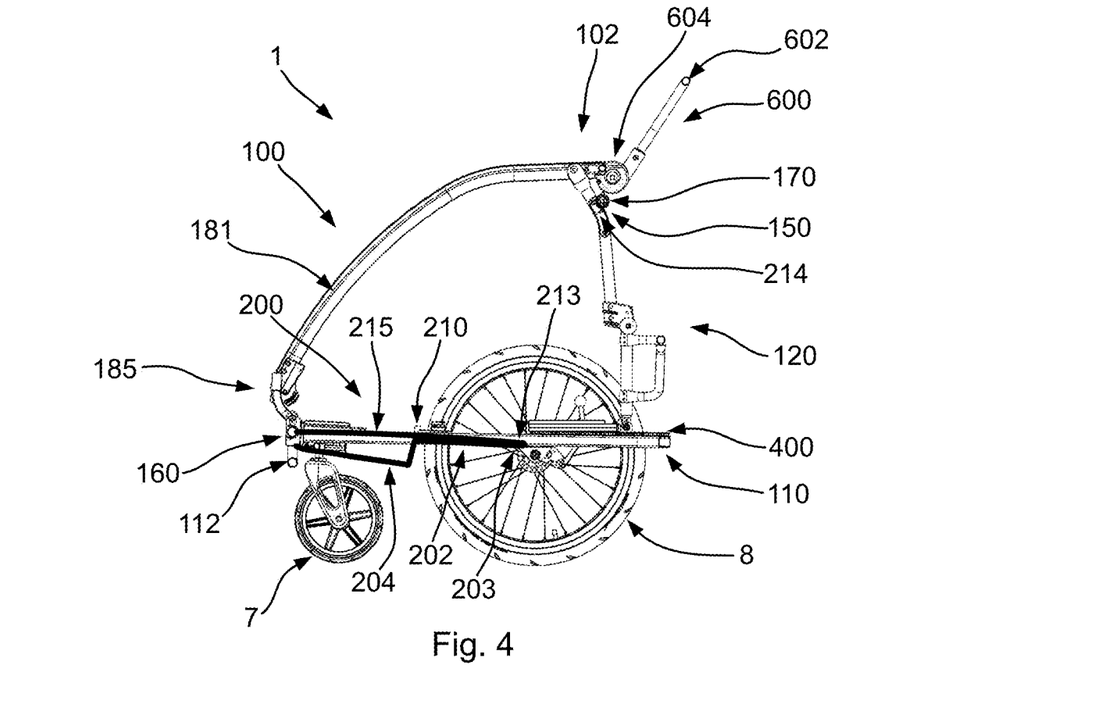
FIG. 4 shows a side view of the bike trailer of FIG. 1 with a seat structure arranged in a stowed state.
Figure 5:
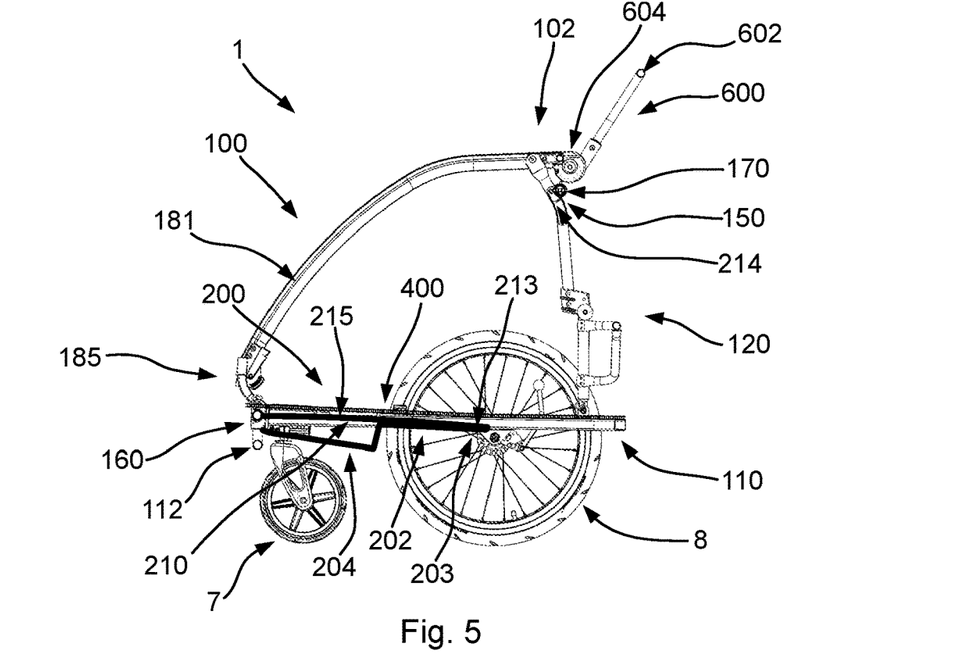
FIG. 5 shows a side view of the bike trailer of FIG. 1 with an adjustable support arrangement being in a loading state and covering the seat structure.
Figure 6:
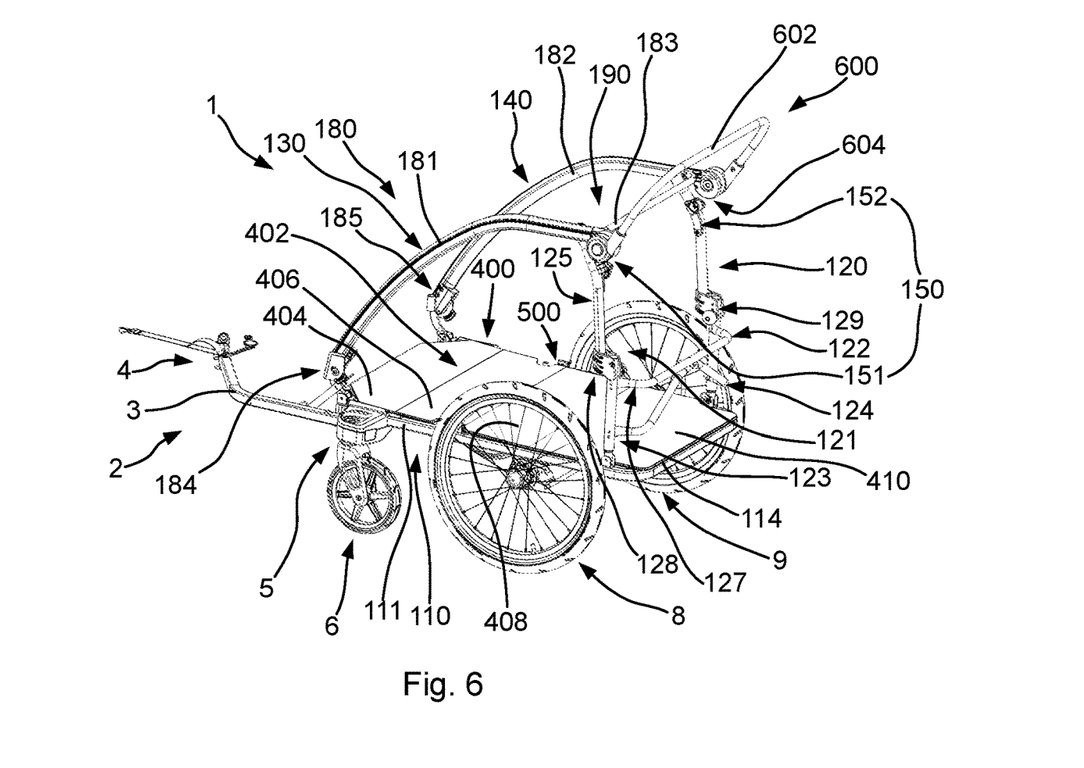
FIG. 6 shows a perspective view of the bike trailer of FIG. 5.

As already mentioned before, the cross member 170 may be selectively detachably mountable at the first fixation portion 150 and at the second fixation portion 160. Accordingly, the position of the second end portion 214 of the seat structure 200 may be changed. Due to the overall configuration as described before, the seat structure 200 may thus be folded by changing the position of the cross member 170. If the cross member 170 is detachably fixed on the first fixation portion 150, the seat structure is in an operational state in which the seat structure 200 forms a seating area for the passenger. If the cross member 170 is detachably fixed on the second fixation portion 160, the seat structure 200 is in a stowed state in which the seat structure 200 is folded away thereby allowing the transport of loads other than passengers. FIG. 3 shows a configuration in which the seat structure 200 is in the operational state. FIGS. 4 and 5 show configurations in which the seat structure 200 is in the stowed state. In the stowed state, a rear surface 215 of the backrest portion 210 faces upwards and, in some embodiments, may be used for supporting a load in the bike trailer 1.

The first fixation portion 150 may comprise a locking mechanism 310 for releasably locking the cross member 170 to the main frame 100. Optionally, the cross member 170 may comprise a locking mechanism which is able to engage end portions of the cross member 170 with the main frame 100. Such a locking mechanism may comprise retractable engaging members in end portions of the cross member 170 which are configured, for example prebiased, to normally protrude from the end portions and which may be retracted through operation of an operating mechanism, for example a push or squeeze button provided on the cross member 170.

Figure 7:
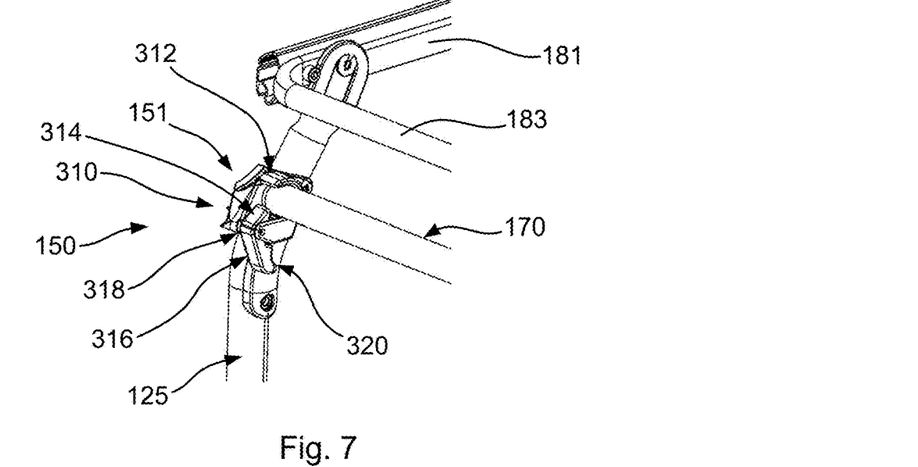
FIG. 7 shows an enlarged perspective view of a first coupling section of a first fixation portion on a main frame of the bike trailer together with a locking mechanism.
Figure 8:
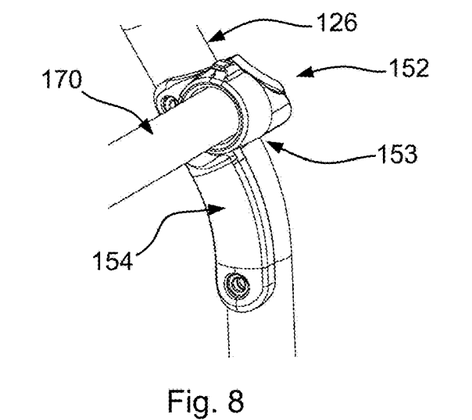
FIG. 8 shows an enlarged perspective view of a second coupling section of a first fixation portion on a main frame of the bike trailer.

The construction of the first fixation portion 150 and of the locking mechanism 310 according to an embodiment will be further described with reference to FIGS. 7 and 8. FIG. 7 shows an enlarged view of the first coupling section 151 provided on the main frame on one lateral side of the accommodating space 190. FIG. 8 shows an enlarged view of the second coupling section 152 provided on the main frame 100 on an opposite lateral side of the accommodating space 190. As is further shown in FIG. 7, the locking mechanism 310 may be provided in the first coupling section 151.

The locking mechanism 310 may comprise a receiving portion 312 and a locking portion 314. The locking portion 314 may be transferable between a locking position and a release position. In the locking state, the locking portion 314 acts as a stop thereby positively locking the cross member 170 in the receiving portion 312. In the release state, the locking portion 314 is retracted and allows a detachment of the cross member 170 from the receiving portion 312. The locking portion 314 may be operatively coupled to an operating portion 316 which is operable by a user. The locking portion 314 may be prebiased towards the locking state by means of an urging member 318 embodied as a spring in the present embodiment. In the embodiment, the locking portion 314 and the operating portion 316 are integrally formed as a lever 320. The lever 320 may be pivotably arranged on the main frame 100. More precisely, the lever 320 may be pivotably arranged such that the locking portion 314 is transferable from the locking state into the release state by a pivoting movement of the locking portion 314 towards the receiving portion 312. A pivoting axis about which the locking portion 314 is pivotable may be arranged in parallel with the extension direction of the cross bar 172 when the same is inserted in the receiving portion 312. The receiving portion 312 may comprise a substantially C-shaped recess which is open towards the rear end side of the bike trailer 1. A lower portion of the lever 320 may be formed as operating portion 316. If a user wants to detach the cross member 170 from the first fixation portion 150, the user needs to first pull the operating portion 316 in rear direction in order to rotate the locking portion 314 in a direction towards the receiving portion 312 and finally into a release position such that the locking mechanism 310 is in a release state. After that, the end portion of the cross member 170 may be pulled out of the receiving portion 312 in a direction perpendicular to the extension direction of the cross member 170.

According to the embodiment, the second coupling section 152 may be configured differently and may not comprise a locking mechanism. Rather, the second coupling section 152 may comprise a cup-shaped receiving portion 153 which is fixed to the rear frame portion 120 by means of a coupling member 154. An opening of the receiving portion 153 may be oriented towards the first coupling section 151 so that an end portion of the cross member 170 can be inserted into the cup shaped receiving portion 153 first by moving the same in longitudinal direction. As soon as the end portion is inserted in the cup-shaped receiving portion 153, the end portion and the cup-shaped receiving portion 153 cooperate so as to form a joint similar to a ball joint. The opposite end portion of the cross member 170 can then be inserted into the receiving portion 312 by pivoting the cross member 170 about the cup-shaped receiving portion 153.

Figure 9:
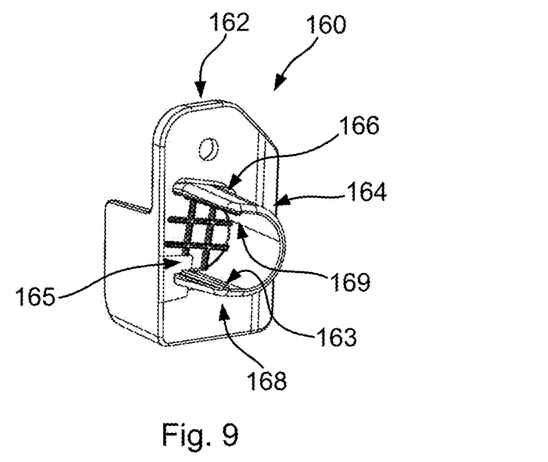
FIG. 9 shows a coupling section of a second fixation portion of the main frame.

As is shown in FIG. 9, a possible configuration of a second coupling section 162 is shown. The second coupling section 162 may be formed similar to the receiving portion 312 and may comprise a C-shaped receiving portion 164. Accordingly, the second coupling section 162 may comprise a receiving portion which allows to insert an end portion of the cross member 170 by moving the same in radial direction or in a direction cross to the main extension direction of the cross member 170. In order to securely hold the end portions of the cross member 170 in the second coupling section 162, the receiving portion 164 may comprise end portions 166, 168 defining an insertion opening 165 between them. The end portions 166, 168 can be formed flexible and can comprise protrusions 169, 163 slightly reducing the size of the opening. With such a configuration, the end portion of the cross member 170 may snap into the receiving portion 164. It is noted that the first coupling section 161 may be formed in a similar manner on an opposite side of the main frame 100.

In some embodiments, a support arrangement 400 may be provided for covering the seat structure in the stowed state. Alternatively, such a support arrangement 400 may be provided for covering a lower portion of the accommodating space 190 or simply for providing a suitable supporting surface for supporting loads. The support arrangement 400 may also be used for bike trailers with a different seat structure as long as the seat structure may be brought into a state which allows covering the seat structure or may even be used in connection with bike trailers in which the seat structure is removable for transporting loads. Furthermore, it is noted that in case such a support arrangement 400 is used in connection with a seat structure, for example the seat structure as described above, it is not necessary to detachably fix the cross member 170 at the second fixation portion 160. Rather, it is also possible to merely detach the cross member 170 from the first fixation portion 150 and to fold the backrest portion 210 down such that it is possible to cover the same using the support arrangement 400. Thus, in a modification of the bike trailer 1, the second fixation portion 160 may be omitted.

Figure 10:
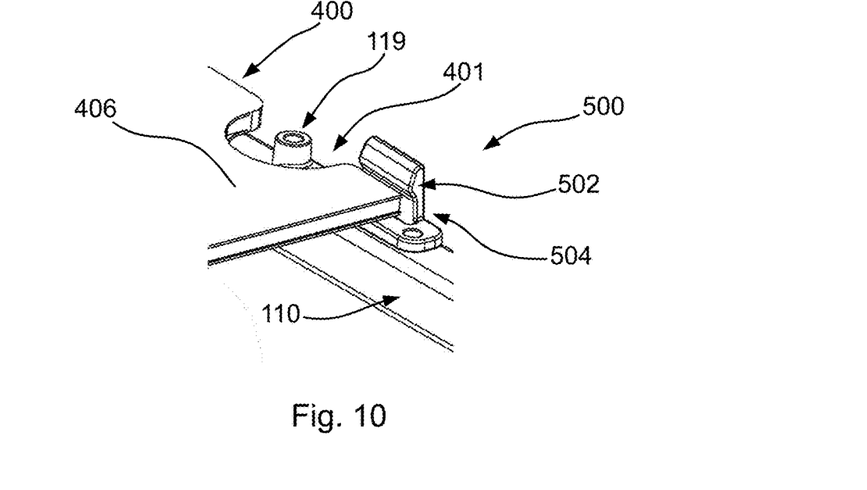
FIG. 10 shows an enlarged perspective view of the fixation arrangement for releasably arresting the support arrangement on a lower frame portion of the main frame.

The support arrangement 400 may be adjustable and may be for example transferable between a loading state in which the support arrangement extends over a majority of the lower frame portion 110 of the main frame and a stowed state in which the support arrangement 400 extends over a smaller portion of the lower frame portion. In this way, the support arrangement 400 may provide differently sized supporting areas. In the stowed state, the seat structure 200 may be accommodated in the lower frame portion 110 such that it is at least partially covered by the support arrangement 400 when the same is in the loading state. The support arrangement 400 may be configured foldable. For that, the support arrangement 400 may comprise multiple segments 404, 406, 408, 410 that may be pivotably coupled to each other. Each segment may be formed flat and rigid. For securely holding the support arrangement 400 on the lower frame portion 110, the main frame 100 may comprise a fixation arrangement 500 for releasably arresting the support arrangement 400. The fixation arrangement may comprise a fastener, for example a Velcro fastener. In addition or alternatively, the fixation arrangement 500 may comprise an engaging member 502 which is configured to releasably engage with a portion of the support arrangement 400 as is shown in FIG. 10. The engaging member 502 may comprise a latching portion 504 configured to partially surround a portion of the support arrangement 400. As is further shown in FIG. 10 the support arrangement 400 may comprise a cutout or recess 401 in an edge portion thereof providing accessibility to a fixation portion 119 on the lower frame portion 110.

Figure 11:
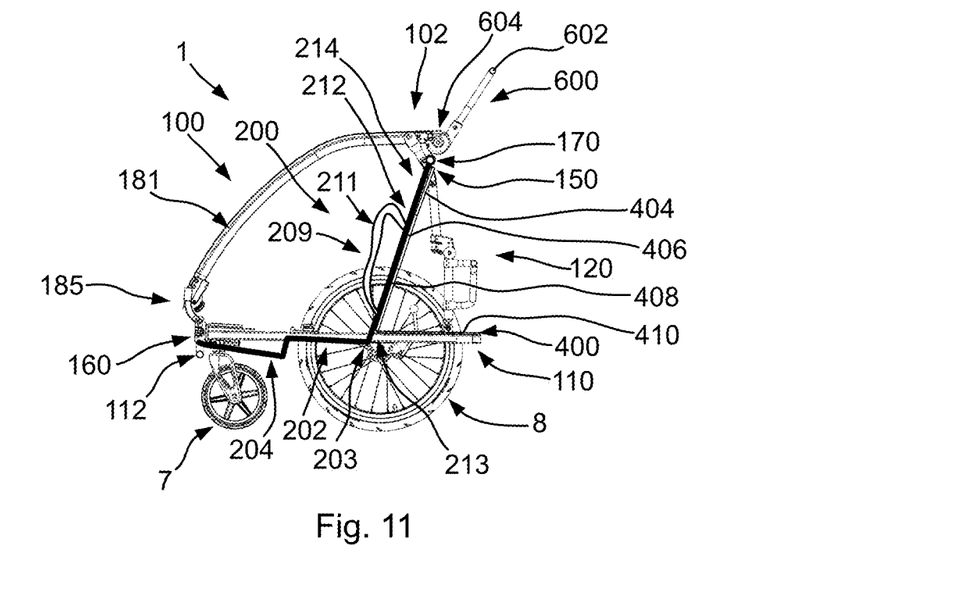
FIG. 11 shows a side view of a modified bike trailer.
Figure 12:
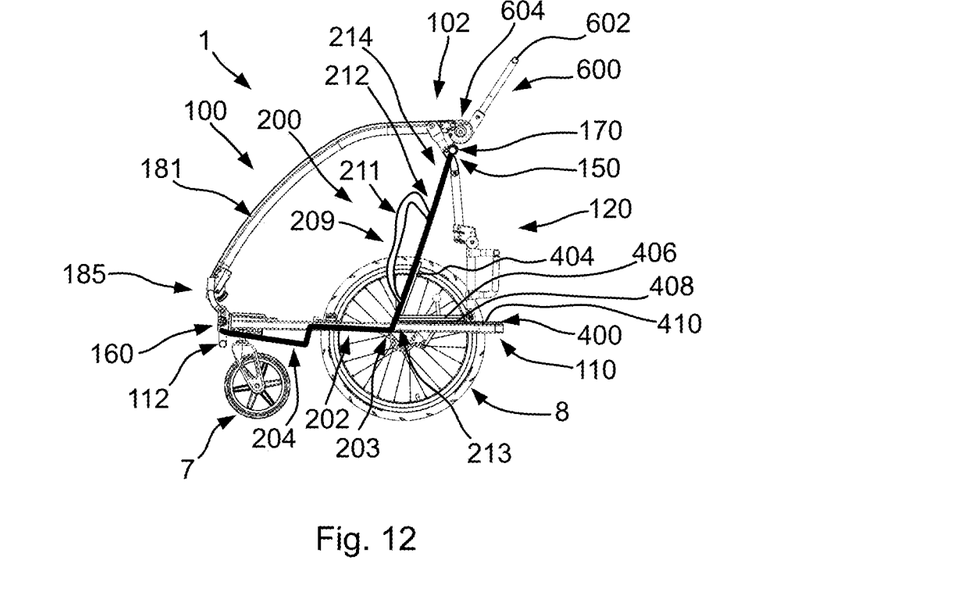
FIG. 12 shows a side view of a further modified bike trailer.

In the stowed state, the support arrangement 400, more precisely the segments thereof, may be stacked upon each other in order to allow stowing them in a space-saving manner. This is for example shown in FIGS. 2, 3 and 4. For example, the segments may be accommodated in a space behind the backrest portion 210. However, according to modifications of the bike trailer 1 as shown in FIGS. 11 and 12, at least one segment 404 or all segments 404, 406, 408 that are normally used for covering the backrest portion 210 when the same is in the stowed state, may be used for providing an additional support for the backrest portion 210. FIG. 11 shows a configuration in which an end portion of the support arrangement 400 is coupled to a rear upper end portion of the main frame 100 in such a manner that the backrest portion 210 is supported by the segments from behind. FIG. 12 shows a configuration in which only the foremost segment 404 provides an additional support of a lower portion of the backrest portion 210.

In conclusion, it is pointed out that the terms like "comprising" or the like are not intended to rule out the provision of additional elements or steps. Let it further be noted that "a" or "an" do not preclude a plurality. In addition, features described in conjunction with the different embodiments can be combined with each other however desired. It is also noted that the reference numbers in the claims are not to be construed as limiting the scope of the claims. Moreover, while at least one exemplary embodiment has been presented in the foregoing summary and detailed description, it should be appreciated that a vast number of variations exist.

It should also be appreciated that the exemplary embodiment or exemplary embodiments are only examples, and are not intended to limit the scope, applicability, or configuration in any way. Rather, the foregoing summary and detailed description will provide those skilled in the art with a convenient roadmap for implementing an exemplary embodiment, it being understood that various changes may be made in the function and arrangement of elements described in an exemplary embodiment without departing from the scope as set forth in the appended claims and their legal equivalents.

What is claimed is:

1. A bike trailer comprising:
a main frame comprising a lower frame portion, a rear frame portion, and two side frame portions provided on opposite lateral sides of said lower frame portion, said main frame defining an accommodating space for a passenger or load to be transported; and
a seat structure transferable between an operational state in which said seat structure forms a seating area for said passenger, and a stowed state in which said seat structure is folded away thereby allowing the transport of loads other than passengers,
wherein said seat structure comprises a backrest portion with a seating side for at least partially contacting the back of a passenger,
wherein said backrest portion is configured to be accommodated in said bike trailer such that at least said seating side of said backrest portion is protected against contact with loads to be carried when said seat structure is in said stowed state,
wherein said main frame comprises at least a first fixation portion for coupling an upper end portion of said backrest portion to said main frame,
wherein said seat structure is in said operational state when said upper end portion is coupled to said first fixation portion, and
wherein said seat structure is configured to be decoupled from said first fixation portion to move said seat structure from said operational state to said stowed state.

2. The bike trailer according to claim 1, wherein said main frame comprises a second fixation portion for coupling said upper end portion of said backrest portion to said main frame, wherein when said upper end portion is coupled to said second fixation portion said seat structure is in said stowed state.

3. The bike trailer according to claim 2, further comprising a cross member for coupling said upper end portion to said main frame, wherein each fixation portion is configured to detachably receive said cross member.

4. The bike trailer according to claim 3, wherein said cross member comprises a cross bar.

5. The bike trailer according to claim 3, wherein at least said first fixation portion comprises a locking mechanism for releasably locking said cross member to said main frame, wherein said locking mechanism comprises a receiving portion and a locking portion transferable between a locking state in which said locking portion acts as a stop thereby positively locking said cross member in said receiving portion and a release state in which said locking portion is retracted and allows a detachment of said cross member from said receiving portion.

6. The bike trailer according to claim 5, wherein said locking portion is operatively coupled to an operating portion operable by a user.

7. The bike trailer according to claim 5, wherein said locking portion is pre-biased towards said locking state by an urging member.

8. The bike trailer according to claim 7, wherein said urging member is a spring.

9. The bike trailer according to claim 6, wherein said locking portion and said operating portion are integrally formed as a lever, wherein said lever is pivotably arranged on said main frame such that said locking portion is transferable from said locking state into said release state by a pivoting movement of said locking portion towards said receiving portion.

10. The bike trailer according to claim 2, wherein said first fixation portion is provided on said rear frame portion.

11. The bike trailer according to claim 2, wherein said second fixation portion is provided at a forward portion of said lower frame portion.

12. The bike trailer according to claim 5, wherein at least said first fixation portion comprises a first coupling section provided on said main frame on one lateral side of said accommodating space, and a second coupling section provided on said main frame on an opposite lateral side of said accommodating space, wherein said locking mechanism is provided in one of said first coupling section and said second coupling section.

13. A bike trailer comprising:
a main frame comprising a lower frame portion, a rear frame portion, and two side frame portions provided on opposite lateral sides of said lower frame portion, said main frame defining an accommodating space for a passenger or load to be transported;
a seat structure transferable between an operational state in which said seat structure forms a seating area for said passenger, and a stowed state in which said seat structure is folded away thereby allowing the transport of loads other than passengers, wherein said seat structure comprises a backrest portion with a seating side for at least partially contacting the back of a passenger, wherein said backrest portion is configured to be accommodated in said bike trailer such that at least said seating side of said backrest portion is protected against contact with loads to be carried when said seat structure is in said stowed state: and
an adjustable support arrangement transferable between a loading state in which said adjustable support arrangement extends over a majority of said lower frame portion of said main frame thereby providing a load carrying surface and a stowed state in which said adjustable support arrangement extends over a smaller portion of said lower frame portion.

14. The bike trailer according to claim 13, wherein in said stowed state said seat structure is accommodated in said lower frame portion such that it is at least partially covered by said adjustable support arrangement when said adjustable support arrangement is in said loading state.

15. The bike trailer according to claim 13, wherein said adjustable support arrangement is configured to extend over a smaller portion of said lower frame portion when said seat structure is in said stowed state and said adjustable support arrangement is configured to at least partially support said backrest portion when said seat structure is in said operational state.

16. The bike trailer according to claim 13, wherein said adjustable support arrangement comprises segments pivotably coupled to each other.

17. The bike trailer according to claim 16, wherein one or more of said segments is flat and rigid.

18. The bike trailer according to claim 13, wherein said bike trailer comprises a fixation arrangement for releasably arresting said adjustable support arrangement on said lower frame portion in said loading state.

19. The bike trailer according to claim 18, wherein said fixation arrangement comprises fasteners or an engaging member configured to engage with a portion of said adjustable support arrangement.

* * * * *